United States Patent
Sagar et al.

(10) Patent No.: US 12,459,743 B2
(45) Date of Patent: Nov. 4, 2025

(54) WELDLESS CONVEYOR BELT SYSTEMS AND METHODS

(71) Applicant: Cambridge International, Inc., Cambridge, MD (US)

(72) Inventors: Prahlad N. Sagar, Bangalore (IN); Amit Prabhu, Pune (IN); Thomas O. Perdue, Salisbury, MD (US)

(73) Assignee: Cambridge International, Inc., Cambridge, MD (US)

( * ) Notice: Subject to any disclaimer, the term of this patent is extended or adjusted under 35 U.S.C. 154(b) by 92 days.

(21) Appl. No.: 18/367,363

(22) Filed: Sep. 12, 2023

(65) Prior Publication Data
US 2024/0083681 A1    Mar. 14, 2024

Related U.S. Application Data (60) Provisional application No. 63/406,222, filed on Sep. 13, 2022.

(51) Int. Cl.
*B65G 17/06* (2006.01)

(52) U.S. Cl.
CPC ......... *B65G 17/064* (2013.01); *B65G 17/063* (2013.01); *B65G 2207/12* (2013.01)

(58) Field of Classification Search
CPC .. B65G 17/064; B65G 17/063; B65G 17/062; B65G 2207/12; B65G 17/086; B65G 17/083
See application file for complete search history.

(56) References Cited

U.S. PATENT DOCUMENTS

| | | |
|---|---|---|
| 2,619,306 A | 11/1952 | Van Lake |
| 3,159,267 A | 12/1964 | Jeffrey |
| 3,176,358 A | 4/1965 | Leflon |
| 4,754,871 A | 7/1988 | Gustafson |
| 4,832,187 A | 5/1989 | Lapeyre |
| 4,886,158 A | 12/1989 | Lapeyre |
| 4,934,518 A | 6/1990 | Lapeyre |
| 4,944,716 A | 7/1990 | Graff |
| 4,957,597 A | 9/1990 | Irwin |
| 4,972,942 A | 11/1990 | Faulkner |
| 5,024,321 A | 6/1991 | Lapeyre |
| 5,054,609 A | 10/1991 | Poerink |

(Continued)

FOREIGN PATENT DOCUMENTS

| | | |
|---|---|---|
| CN | 101910676 A | 12/2010 |
| CN | 111670152 A | 9/2020 |

(Continued)

OTHER PUBLICATIONS

PCT International Search Report and Written Opinion, PCT/US2023/032534, Jan. 12, 2023, 14 pages.

*Primary Examiner* — Mark A Deuble
(74) *Attorney, Agent, or Firm* — Quarles & Brady LLP (57) ABSTRACT

A conveyor belt is provided that includes a first lateral end, a second lateral end, a plurality of rods, and a plurality of links. The plurality of rods are spaced apart from one another and each extends from the first lateral end to the second lateral end. The plurality of links interconnect the plurality of rods and include a first link coupled to two adjacent rods of the plurality of rods at the first lateral end. The first link includes a tail that extends laterally outward past an outermost portion of the plurality of rods.

19 Claims, 9 Drawing Sheets

(56) References Cited

U.S. PATENT DOCUMENTS

| | | | |
|---|---|---|---|
| 5,058,732 A | 10/1991 | Lapeyre | |
| 5,065,860 A * | 11/1991 | Faulkner | B65G 15/54 |
| | | | 198/848 |
| 5,083,660 A | 1/1992 | Horton | |
| 5,105,938 A | 4/1992 | Tan | |
| 5,123,524 A | 6/1992 | Lapeyre | |
| 5,156,262 A | 10/1992 | Horton | |
| 5,156,264 A | 10/1992 | Lapeyre | |
| 5,335,768 A | 8/1994 | Schladweiler | |
| 5,598,916 A | 2/1997 | Horton et al. | |
| 5,816,390 A | 10/1998 | Stebnicki | |
| 5,829,578 A * | 11/1998 | Froderberg | B65G 17/064 |
| | | | 198/848 |
| 5,899,322 A | 5/1999 | Gamble, Jr. | |
| 5,954,187 A | 9/1999 | Hager | |
| 6,070,715 A * | 6/2000 | Etherington | B65G 17/064 |
| | | | 198/848 |
| 6,102,196 A | 8/2000 | Domit, Jr. | |
| 6,202,833 B1 | 3/2001 | Greer | |
| 6,325,205 B1 | 12/2001 | Heyde | |
| 6,345,715 B2 | 2/2002 | Palmaer | |
| 6,354,432 B1 | 3/2002 | Maine, Jr. et al. | |
| 6,371,284 B1 | 4/2002 | Pasch | |
| 6,615,979 B2 | 9/2003 | Etherington et al. | |
| 6,814,223 B1 | 11/2004 | Verdigets et al. | |
| 7,073,662 B2 | 7/2006 | Neely et al. | |
| 7,108,127 B2 | 9/2006 | Krisl | |
| 7,255,227 B2 | 8/2007 | Melancon | |
| 7,284,657 B2 | 10/2007 | Ulsh et al. | |
| 7,331,447 B2 | 2/2008 | Krisl et al. | |
| 7,344,019 B2 * | 3/2008 | Chandran | B65G 17/064 |
| | | | 99/443 C |
| 7,494,005 B2 | 2/2009 | Messick, Jr. et al. | |
| 7,530,454 B2 | 5/2009 | Neely et al. | |
| 7,600,632 B2 | 10/2009 | Hall | |
| 7,721,877 B2 | 5/2010 | Maine, Jr. et al. | |
| 7,766,159 B2 | 8/2010 | Krisl | |
| 7,802,675 B2 | 9/2010 | Hall | |
| 7,987,972 B2 | 8/2011 | Hennigar et al. | |
| 8,225,922 B1 | 7/2012 | Fourney | |
| 8,544,638 B2 | 10/2013 | Meulenkamp et al. | |
| 8,607,967 B2 | 12/2013 | Neely et al. | |
| 8,636,141 B2 | 1/2014 | Neely et al. | |
| 8,720,676 B2 | 5/2014 | Neely et al. | |
| 8,739,966 B2 * | 6/2014 | Record | B65G 15/30 |
| | | | 198/848 |
| 8,752,698 B2 | 6/2014 | Lasecki et al. | |
| 8,757,366 B2 | 6/2014 | MacLachlan | |
| 8,857,607 B2 | 10/2014 | Lasecki et al. | |
| 8,985,318 B2 | 3/2015 | Neely | |
| 9,061,829 B2 | 6/2015 | Salsone et al. | |
| 9,096,380 B2 | 8/2015 | Lasecki et al. | |
| D739,110 S | 9/2015 | Barcus et al. | |
| 9,169,074 B2 | 10/2015 | Messick, Jr. et al. | |
| 9,216,859 B2 | 12/2015 | Visconti et al. | |
| 9,522,786 B2 | 12/2016 | Lasecki et al. | |
| 9,694,979 B2 | 7/2017 | Ulchak et al. | |
| 9,764,901 B2 | 9/2017 | Bogle et al. | |
| 10,118,766 B2 | 11/2018 | Perdue et al. | |
| 10,138,065 B2 | 11/2018 | Bogle et al. | |
| 10,183,809 B2 | 1/2019 | Richardson | |
| 10,442,626 B2 | 10/2019 | Marshall et al. | |
| 10,941,834 B2 * | 3/2021 | Ulchak | B65G 17/083 |
| 2010/0258410 A1 | 10/2010 | Wunsch | |
| 2013/0140146 A1 | 6/2013 | Neely et al. | |
| 2013/0140152 A1 | 6/2013 | Neely et al. | |
| 2019/0234485 A1 | 8/2019 | Perdue et al. | |
| 2019/0367280 A1 * | 12/2019 | Bauer | B65G 15/30 |
| 2023/0303331 A1 * | 9/2023 | Van Faassen | B65G 17/064 |

FOREIGN PATENT DOCUMENTS

| | | |
|---|---|---|
| EP | 0032797 A2 | 7/1981 |
| EP | 0711714 A1 | 5/1996 |
| EP | 2238055 B1 | 8/2012 |
| GB | 1066905 A | 4/1967 |
| GB | 1311769 A | 3/1973 |
| GB | 2231318 A | 11/1990 |
| WO | 2010037187 A1 | 4/2010 |

* cited by examiner

WELDLESS CONVEYOR BELT SYSTEMS AND METHODS

CROSS-REFERENCE TO RELATED APPLICATIONS

This application claims priority under 35 U.S.C. § 119 to U.S. Provisional Patent Application No. 63/406,222 filed on Sep. 13, 2022, the entire contents of which is incorporated herein by reference.

BACKGROUND

The present invention is directed to conveyor belt systems and methods and, more specifically, conveyor belt systems and methods with belts comprised of links that engage rods in a weldless fashion.

A commonly used type of conveyor belt for carrying diverse products along both straight and horizontally or helically curved paths is a grid conveyor belt. For example, a grid conveyor belt includes a plurality of spaced transverse rods slidably interconnected by at least two rows of U-shaped connecting links, i.e., the tension bearing members, disposed respectively along the inner and outer edges of the rods. The connecting links are disposed in a nested relationship relative to one another with slots being provided in the links in order to slidably receive the transverse rods. Conventionally, the terminal ends of the transverse rods are formed into enlarged heads or button heads, which retain the links on the rods. Welds are then provided to secure the link to the head/rod, thereby preventing rotational movement of the links on the transverse rods.

Grid conveyor belts of this type are advantageous over other types of belts because of their ability to travel in straight line conveyor paths as well as in curved/helical conveyor paths, thus making grid conveyor belts ideal for use, for example, on spiral cage conveyors. However, there are extensive manufacturing costs associated with weld inspections, patch-table rework, field services visits to make inspections and repairs, etc. For example, when a belt is in need of repair due to breakage or maintenance, the presence of the button head ends and welded ends requires the use of special tools, such as a grinder and bolt cutter. Moreover welding is often required to repair an endless belt or to reconnect or splice two separate ends of a belt. In addition, such welded belts cannot be used in applications where a plastic overlay along the belt is needed or preferred due to the flammability associated with the plastic overlay.

Accordingly, there exists a need for a weldless grid conveyor belt.

SUMMARY OF THE DISCLOSURE

Some embodiments provide a conveyor belt including a first lateral end, a second lateral end, a plurality of rods, and a plurality of links. The plurality of rods are spaced apart from one another and each extends from the first lateral end to the second lateral end. The plurality of links interconnect the plurality of rods and include a first link coupled to two adjacent rods of the plurality of rods at the first lateral end. The first link includes a tail that extends laterally outward past an outermost portion of the plurality of rods.

In some embodiments, a first rod of the two adjacent rods terminates with a hook, where the hook extends through a slot of the tail. In some embodiments, the tail includes two tail ends defining the slot therebetween. In some embodiments, the hook extends through a trailing part of the slot, around claw portions of the tail ends, and back through a leading part of the slot.

In some embodiments, the plurality of links further includes a second link coupled to the two adjacent rods at the second lateral end. A mesh overlay can extend across the plurality of rods between the first link and the second link and, in some embodiments, the mesh overlay is a plastic mesh overlay.

Some embodiments provide a conveyor belt including a plurality of rods and a plurality of links. The plurality of rods are spaced apart from one another, with each of the plurality of rods including a first lateral end portion with a first hook that terminates at a tip. The plurality of links interconnect the plurality of rods, and each of the plurality of links includes a middle portion, an inner leg extending from the middle portion, an outer leg extending from the middle portion, a first set of holes extending through the inner leg and the outer leg, and a tail extending from the outer leg, where the tail includes a slot. A first rod of the plurality of rods engages a first link of the plurality of links such that the first hook extends through the first set of holes and the slot and the tip faces an outer surface of the outer leg.

In some embodiments, each of the plurality of links further includes a second set of holes extending through the inner leg and the outer leg. The first set of holes are circular through-holes and the second set of holes are slotted through-holes.

In some embodiments, the tail includes a trailing curved portion, an outer curved portion, and a tip, where the slot extends from the tip into the outer curved portion. In some embodiments, the tail further includes a hole extending through the trailing curved portion.

In some embodiments, the tail forms a tear-drop shape with a portion of the outer leg.

In some embodiments, the slot is defined between two forked ends. In some embodiments, the slot is defined between two clawed ends, where each of the two clawed ends includes a claw portion that extends inwardly, and the first hook extends through a trailing part of the slot, around claw portions, and back through a leading part of the slot.

Some embodiments provide a method of forming a conveyor belt including sliding a rod through a first set of holes of a first link and a second set of holes of a second link so that a tip of the rod extends past an outer leg of the first link. The method also includes bending the tip of the rod to form a hook and bending a tail of the first link that extends from the outer leg back toward the outer leg until ends of the tail close around either side of the hook.

In some embodiments, the method also includes pulling the ends of the tail apart from each other to close the ends around either side of the hook.

In some embodiments, bending the tail of the first link includes bending the tail until a slot of the tail terminates above a trailing-most point of the first set of holes. In some embodiments, bending the tip of the rod to form the hook includes bending the tip of the rod until the tip faces an outer surface of the outer leg of the first link.

In some embodiments, the method also includes compressing a mesh overlay away from the first link before bending the tip of the rod, and uncompressing the mesh overlay after bending the tip of the rod.

The foregoing and other aspects and advantages of the present disclosure will appear from the following description. In the description, reference is made to the accompanying drawings that form a part hereof, and in which there is shown by way of illustration one or more exemplary versions. These versions do not necessarily represent the full scope of the disclosure.

BRIEF DESCRIPTION OF THE DRAWINGS

The following drawings are provided to help illustrate various features of non-limiting examples of the disclosure, and are not intended to limit the scope of the disclosure or exclude alternative implementations.

DETAILED DESCRIPTION

Some embodiments provide a conveyor belt including a plurality of rods and a plurality of links configured to lock the rods to the links without welding. For example, the links according to some embodiments can lock the rods in place in a weldless manner to prevent side-to-side movement as well as inhibit rotation of a rod relative to the links, which can keep the conveyor belt flat during expansion and collapse. Additionally, a weldless configuration allows for manufacturing the conveyor belt, in some applications, with a plastic mesh overlay without the concerns that are generally associated with welding near plastic pieces. Furthermore, the links, according to some embodiments, provide a favorable line or area contact surface for contact with a spiral rotating drum in order to effectively drive the conveyor belt forward with very low tension.

Figure 1:
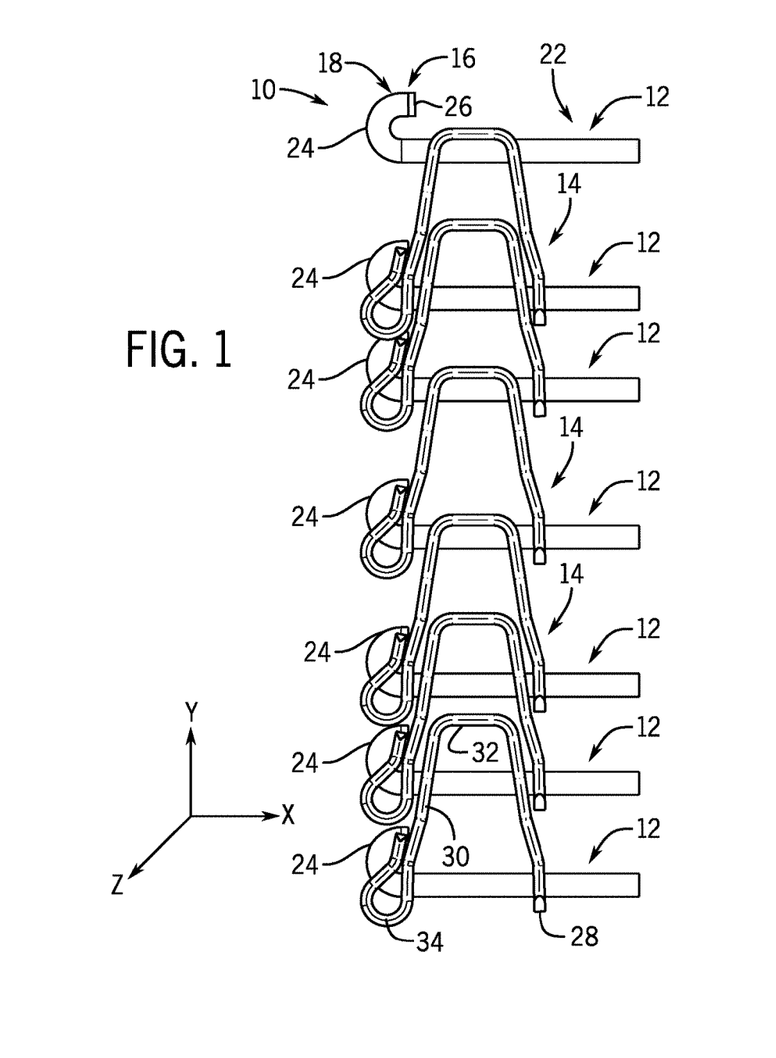
FIG. 1 illustrates a top-down view of a portion of a conveyor belt according to some embodiments.
Figure 2:
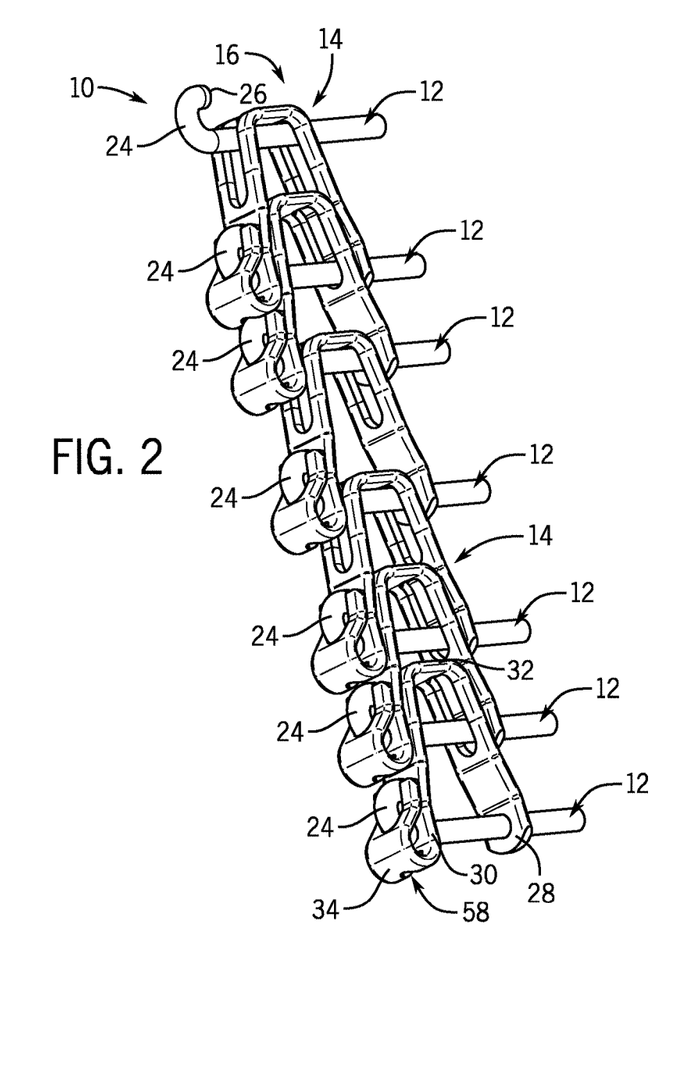
FIG. 2 illustrates an isometric view of the conveyor belt of FIG. 1.

Accordingly, FIGS. 1 and 2 illustrate a portion of a conveyor belt 10 according to some embodiments. As shown in FIGS. 1 and 2, the conveyor belt 10 can include a plurality of rods 12 coupled together by a plurality of links 14. More specifically, the rods 12 are generally spaced apart and aligned in a row along a single plane (e.g., a plane of travel, along a Y-axis as illustrated in FIG. 1) and the links 14 can interconnect adjacent rods 12 along lateral ends thereof. For example, FIGS. 1 and 2 illustrate a first lateral end 16 of the conveyor belt 10, corresponding to first lateral end portions 18 of the plurality of rods 12. Though not shown, it should be noted that the conveyor belt 10 can include an opposite, second lateral end substantially identical to, but a mirror image of, the first lateral end 16. Accordingly, discussion herein with respect to the first lateral end 16 of the conveyor belt 10 and first lateral end portions 18 of the rods 12 can also apply to the second lateral end of the conveyor belt 10 and second lateral end portions of the rods 12, respectively.

Figure 13:
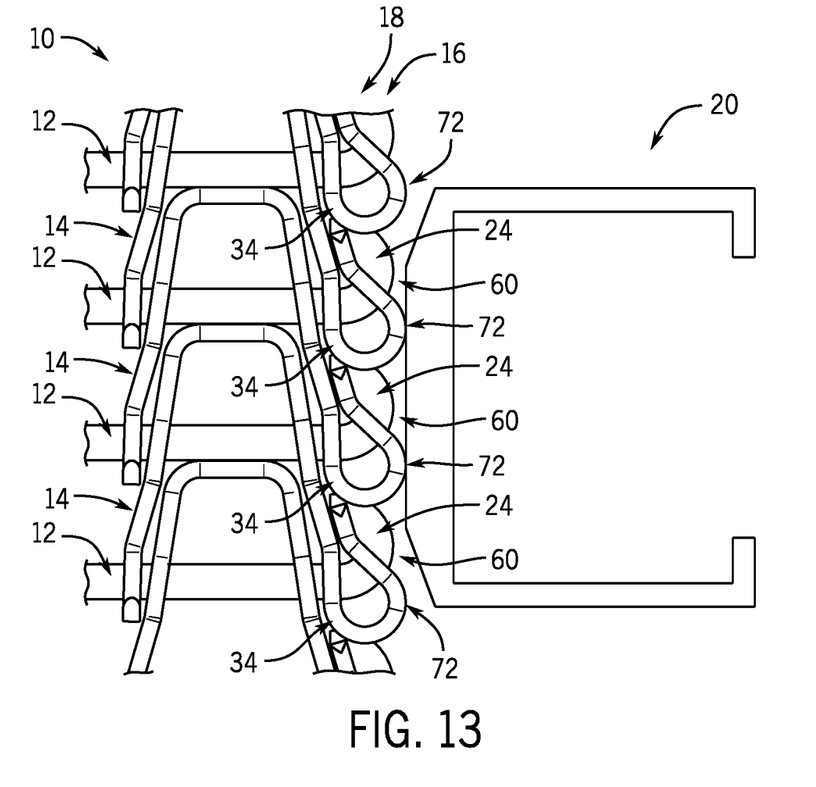
FIG. 13 illustrates a bottom-up view of a portion of a conveyor belt, according to some embodiments, relative to an example drive bar.

In operation, the conveyer belt 10 can be driven by one or more drive bars 20 (illustrated in FIG. 13). More specifically, the drive bars 20 can engage one or both lateral ends 16 of the conveyor belt 10 to positively drive the conveyor belt 10 along the plane of travel. In some applications, the conveyor belt 10 can be driven in a spiral cage system (not shown), in which an internal rotating drum includes the drive bars 20, which contact one lateral end 16 of the conveyor belt 10 to drive the conveyor belt 10 through friction and traction. In other applications, the conveyor belt 10 can be driven in straight-running applications, in which drive wheels/sprockets engage the conveyor belt 10 (e.g., rods 12) from above or below to drive the conveyor belt 10 through friction, traction, and/or direct drive engagement.

When being driven, the links 14 can engage the rods 12 in a way to couple the rods 12 together and allow the rods 12 to move relative to one another along the plane of travel. This can provide a smooth movement of the conveyor belt 10 and also reduce tension during turns/side-flexing. For example, when the conveyor belt 10 is turning, such as during rotation in a spiral cage configuration, the rods 12 can move closer to each other along the first lateral end 16 (e.g., along an "inside" of the turn), while the rods 12 can maintain their spacing or move further apart from each other along the second lateral end (e.g., along an "outside" of the turn). Furthermore, as discussed in additional detail below, the links 14 can engage the rods 12 in a way to prevent, substantially prevent, or reduce rotation of the rods 12 that could cause "tenting" of the conveyor belt 10 during travel, in which one or more links 14 rotates outside of the plane of travel.

Figure 3:
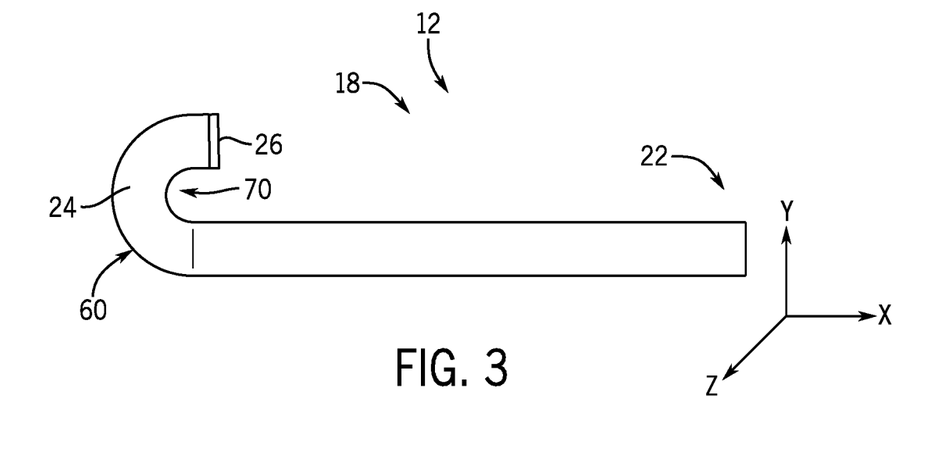
FIG. 3 illustrates a top-down view of a portion of a rod, according to some embodiments, of the conveyor belt of FIG. 1.

Turning now to the rods 12 of the conveyor belt 10, as shown in FIGS. 1, 2, and 3, each rod 12 can include the first lateral end portion 18, a second lateral end portion (not shown), and a middle portion 22 between the first lateral end portion 18 and the second lateral end portion. As noted above, any description of the first lateral end portion 18 can also apply to the second lateral end portion and, thus, for brevity, only the first lateral end portion 18 may be discussed below. Accordingly, still referring to FIGS. 1-3, two links 14 can engage a rod 12 at the first lateral end portion 18. When assembled, the links 14 can be substantially fixed at the first lateral end portion 18 such that the links 14 do not extend into the middle portion 22, as described in more detail below. The middle portion 22 may be free of any material, such that the conveyor belt 10 is a rod-only construction, or may include a mesh overlay construction, in which a metal, plastic, composite, etc. mesh overlay (such as mesh overlay 25, illustrated in FIGS. 15 and 16) extends across and/or between the rods 12 along the middle portions 22 thereof, or a filler construction, in which metal, plastic, composite, etc. filler rods or strips (not shown) extend across and/or between the rods 12 along the middle portions 22 thereof. Additionally, in some embodiments, the rods 12 can comprise metals, such as stainless steel or another metal, plastics, composites, or any other suitable materials.

Referring still to FIGS. 1-3, at the first lateral end portion 18, the rod 12 can terminate with a hook 24. In other words, the rod 12 can include the hook 24 at its first lateral end portion 18. The hook 24 can be a "J-hook," including a "J" shape, in which the rod 12 is bent about 180 degrees such that a tip 26 of the rod 12 lies substantially parallel with the middle portion 22 and faces toward the other lateral end (e.g., along the X-axis in FIG. 3). In other embodiments, the rod 12 may be bent less than or more than 180 degrees. For example, the rod 12 may be bent about 90 degrees such that the tip 26 of the rod 12 lies substantially perpendicular to the middle portion 22 (e.g., forming an "L" shape, where the tip 26 faces the plane of travel along the Y-axis in FIG. 3). In another example, the rod 12 may be bent more than 180 degrees such that the tip 26 of the rod 12 faces the middle portion 22 or part of the first lateral end portion 18. Accordingly, in various embodiments, the hook 24 can be formed by the rod 12 being bent about 90 degrees, about 180 degrees, greater than about 90 degrees, greater than about 180 degrees, between about 90 degrees and about 180 degrees, or between about 180 degrees and about 360 degrees. As discussed below, the rod 12 is preferably configured (e.g., bent at the tip 26) to cooperate with the interlocking features of a particular link 14 construction.

Turning now to the links 14 of the conveyor belt 10, as shown in FIGS. 1, 2, and 4-6, each link 14 can be substantially "U-shaped," including an inner leg 28, an outer leg 30, a middle portion 32 between the inner leg 28 and the outer leg 30, and a tail 34 extending from the outer leg 30. Each link 14 can further include a first set of holes 36, a second set of holes 38, and a slot 40. When assembled into the conveyor belt 10, as shown in FIGS. 1 and 2, the outer leg 30 is positioned along the first lateral end 16 of the conveyor belt 10, while the inner leg 28 is positioned inward from the first lateral end 16 of the conveyor belt 10. In some embodiments, all components of the link 14 (e.g., the inner leg 28, the outer leg 30, the middle portion 32, and the tail 34) can be formed as one integral piece. For example, the link 14 can be formed as a single, integral piece, with the holes 36, 38, and slot 40 punched/formed through, and bent to form the U-shape and the tail 34. In other embodiments, one or more components of the link 14 can be formed separately and coupled together. Additionally, in some embodiments, the link 14 can comprise metal, such as stainless steel or another metal. In other embodiments, the link 14 can comprise plastics, composites, or any other materials suitable to meet particular application requirements.

Figure 7:
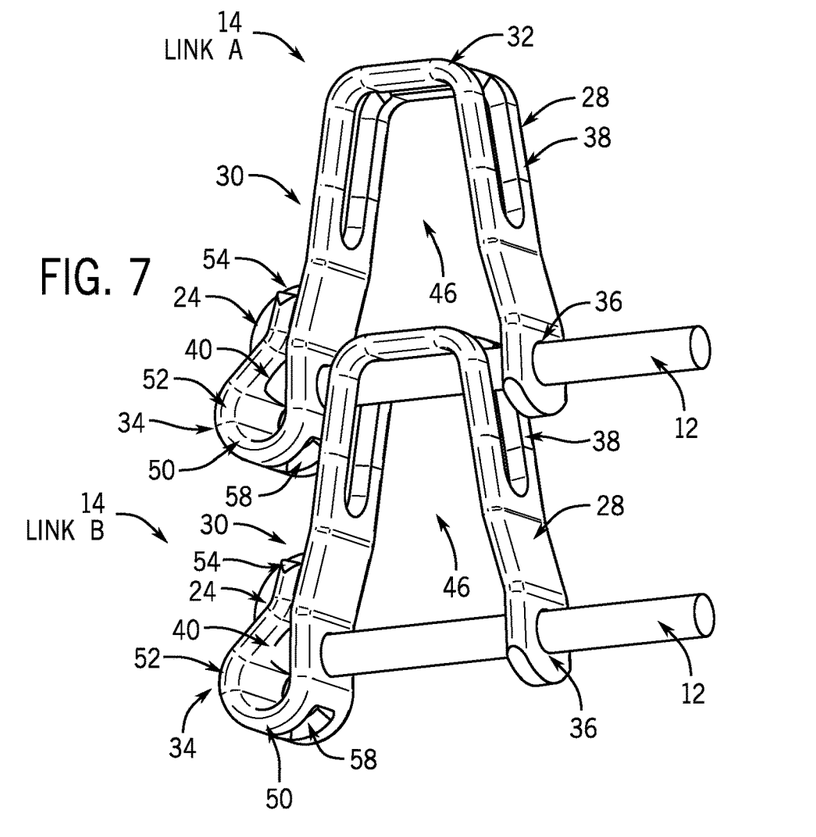
FIG. 7 illustrates another isometric view of a portion of the conveyor belt of FIG. 1.

As further described below and best shown in FIGS. 7 and 8, each link 14 can be configured to engage two rods 12 and to lock/restrain one of the rods 12 to the link 14 without welding. For example, in some embodiments, by locking the rod 12 to the link 14, the rod 12 and link 14 can be coupled together, the rod 12 can be prevented/inhibited from sliding laterally relative to the link 14 (e.g., side-to-side in a direction transverse to a direction of travel of the conveyor belt 10, such as perpendicular along the X-axis in FIG. 1), and/or the rod 12 can be prevented/inhibited from rotating relative to its longitudinal axis (e.g., relative the X-axis in FIG. 1, which would cause undesired tenting of the conveyor belt 10).

Figure 4:
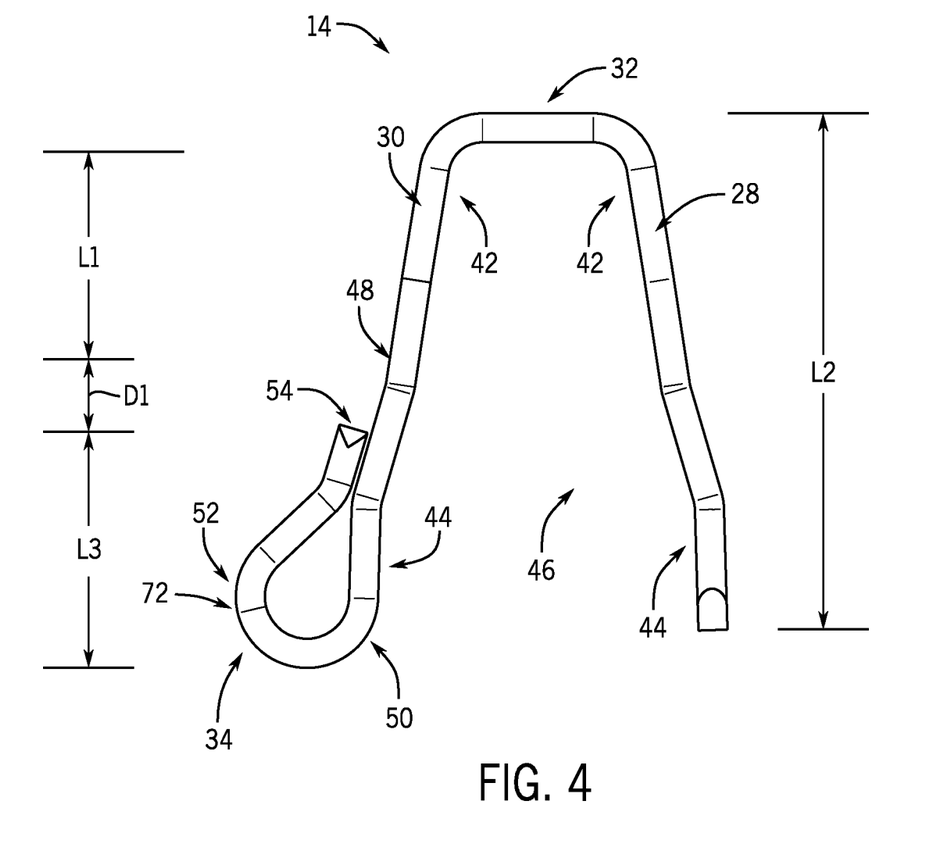
FIG. 4 illustrates a top-down view of a link, according to some embodiments, of the conveyor belt of FIG. 1.
Figure 5:
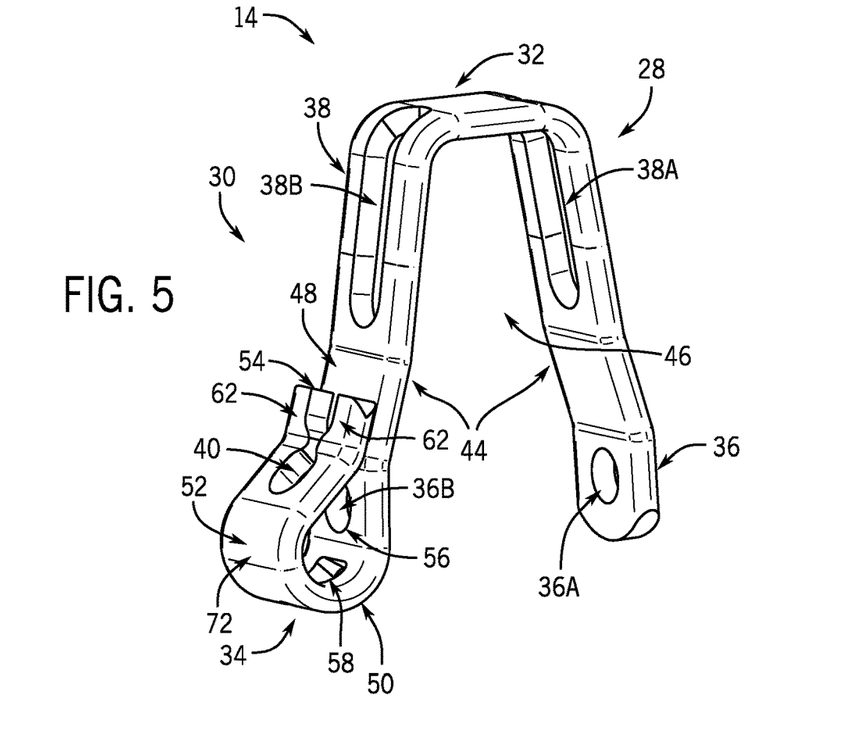
FIG. 5 illustrates an isometric view of the link of FIG. 4.
Figure 6:
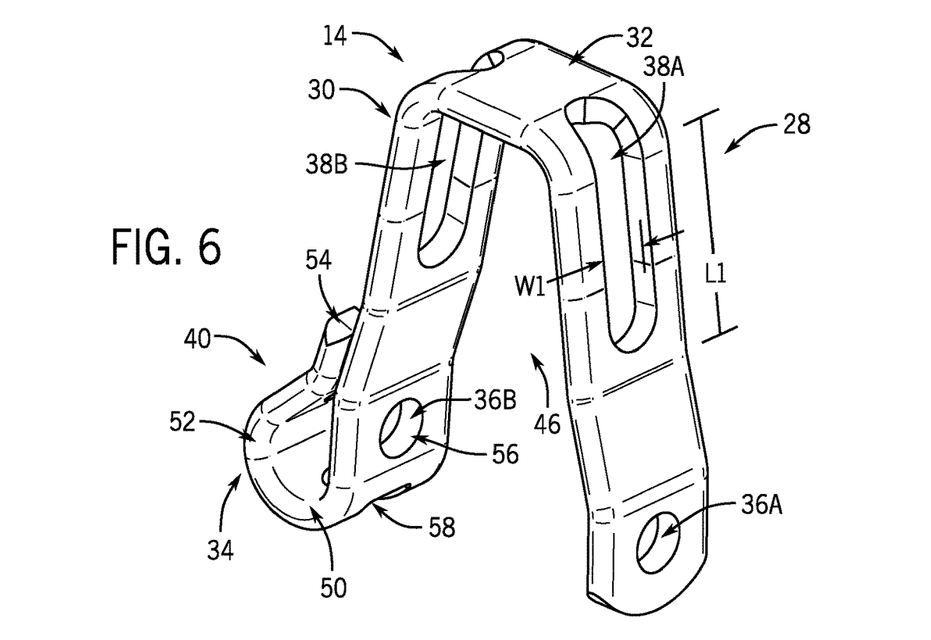
FIG. 6 illustrates another isometric view of the link of FIG. 4.

With further reference to FIGS. 4-6, in some embodiments, the middle portion 32 can be substantially flat or curved. Furthermore, the inner leg 28 and the outer leg 30 can each extend from the middle portion 32 at an angle, a curve, or steps so that a distance between the inner leg 28 and the outer leg 30 is shorter at proximal ends 42 of the legs 28, 30 nearest to the middle portion 32 compared to at distal ends 44 of the legs 28, 30 furthest from the middle portion 32. In this configuration, a middle portion 32 of one link 14 can slide into a space 46 defined between the inner leg 28 and the outer leg 30 of an adjacent link 14 such that the links 14 are disposed in a nested relationship relative to one another. This nested relationship allows a single rod 12 to extend through the first set of holes 36 of one link 14 (e.g., "Link A" in FIG. 7) and the second set of holes 38 of an adjacent link 14 (e.g., "Link B" in FIG. 7) to couple the links 14 together.

More specifically, the first set of holes 36 can extend through the inner leg 28 and the outer leg 30 near distal ends 44 thereof. That is, as shown in FIGS. 5 and 6, the first set of holes 36 can include a first hole 36A extending through the inner leg 28 and a second hole 36B extending through the outer leg 30. The first hole 36A and the second hole 36B can each include a cross-section shaped and sized to generally match a cross-section of a rod 12, thus allowing a first rod 12 to slide through the first set of holes 36 in a first direction (e.g., along the X-axis of FIG. 1) while substantially preventing/inhibiting the first rod 12 from moving relative to the link 14 in a second direction transverse to the first direction (e.g., perpendicularly along the Y-axis) and a third direction transverse to the first direction (e.g., perpendicularly along the Z-axis). Accordingly, in some embodiments, the first set of holes 36 can be considered a circular through-hole extending through the link 14.

The second set of holes 38 can extend through the inner leg 28 and the outer leg 30 near proximal ends 42 thereof. More specifically, as shown in FIGS. 5 and 6, the second set of holes 38 can include a first hole 38A extending through the inner leg 28 and a second hole 38B extending through the outer leg 30. As shown in FIG. 6, the first hole 38A and the second hole 38B can each include a cross-section shaped and sized to include a width W1 generally matching a diameter of the rod 12, and a length L1 larger than the diameter of the rod 12. For example, referring to FIG. 4, in some embodiments, the length L1 of the second set of holes 38 can be less than or equal to about half of a length L2 of the legs 28, 30. Furthermore, in some embodiments, as shown in FIGS. 5 and 6, the second set of holes 38 can extend from proximal ends 42 of the inner and outer legs 28, 30 into the middle portion 32. Thus, a second rod 12 can slide through the second set of holes 38 in the first direction (e.g., along the X-axis), can slide along the second set of holes 38 in the second direction (e.g., along the Y-axis, parallel to a movement direction of the conveyor belt 10), and can be prevented from moving relative to the link 14 in the third direction (e.g., along the Z-axis or about the X-axis). Accordingly, in some embodiments, the second set of holes 38 can be considered a slotted through-hole extending through the link 14.

Additionally, as shown in FIGS. 4-6, the tail 34 can extend from the distal end 44 of the outer leg 30 in a direction away from the inner leg 28 and curve back toward the inner leg 28, terminating adjacent to or touching an outer surface 48 of the outer leg 30. In this manner, the tail 34 can form a tear-drop shape with the outer leg 30 when viewed from the top down, such as in FIGS. 1 and 4. More specifically, for example, the tail 34 can include a first curved portion 50 (e.g., a trailing curved portion), a second curved portion 52 (e.g., an outer curved portion), and a tip 54. In some embodiments, as shown in FIG. 4, an overall length of the tail L3 (e.g., from the first curved portion 50 to the tip 54) can be less than or equal to about half of the length L2 of the outer leg 30. Furthermore, in some embodiments, the tail 34 can extend along a portion of the length L2 of the outer leg 30, but may not reach the second set of holes 38. For example, as shown in FIG. 4, the second set of holes 38 (as indicated by length L1) can be separated from the tail 34 by a distance D1.

As shown in FIG. 5, in some embodiments, the slot 40 can extend from the tip 54 toward the second curved portion 52. For example, the slot 40 can extend from the tip 54 and terminate above a trailing-most point 56 of the first set of holes 36. However, in some embodiments, the slot 40 can extend from the tip 54 and terminate level/in-line with the first set of holes 36. Additionally, in some embodiments, the slot 40 can include a width generally matching a diameter of the rod 12. With this configuration, as shown in FIGS. 1, 2, 7, and 8, the slot 40 can receive the hook 24 of the first rod 12. More specifically, the slot 40 can extend a long enough length to permit the first rod 12 to extend through the slot twice (e.g., the hook 24 can extend through a trailing part of the slot 40 and curve back through a leading part of the slot 40).

Additionally, as shown in FIGS. 2 and 5-8, in some embodiments, the tail 34 can include a hole 58 (e.g., a "relief hole") in the first curved portion 50. As shown, the relief hole 58 can be positioned from the first set of holes 36 in a trailing direction. In some embodiments, during formation of the link 14, e.g., when the tail 34 is bent into position, the relief hole 58 can provide relief to help minimize distortion of the second hole 36B in the outer leg 30 and maintain proper pitch of the first set of holes 36 to ensure the rod 12 can easily slide through the first set of holes 36. Additionally, in some embodiments, as shown in FIGS. 1 and 2, the relief hole 58 can also provide clearance for an adjacent hook 24 when the lateral end 16 of the conveyor belt 10 collapses and the links 14 nest into each other.

Referring back to the slot 40 of the tail 34, as noted above, the slot 40 can receive the hook 24 of the first rod 12. That is, the slot 40 can be configured to permit the first rod 12 to extend through or engage the slot 40 twice due to the curvature of the hook 24. Generally, through engagement with the hook 24, the slot 40 can prevent or substantially prevent/inhibit the first rod 12 from sliding laterally through the first set of holes 36 and from rotating. More specifically, with respect to lateral sliding, the rod 12 cannot slide in a first lateral direction (e.g., "inward" movement toward the opposite lateral end of the conveyor belt 10) due to the tip 26 of the hook 24 abutting the outer surface 48 of the outer leg 30. Furthermore, the rod 12 cannot slide in a second lateral direction (e.g., "outward" movement away from the opposite lateral end of the conveyor belt 10) due to a curved edge 60 of the hook 24 contacting the tail 34 along the second curved portion 52. Accordingly, the rod 12 can be locked in both first and second lateral directions via the hook 24, the tail 34, and the outer leg 30. As a result, no additional features are needed, for example, adjacent the inner leg 28, to maintain the rod 12 in position so that the link 14 does not extend into the middle portion 22 of the rod 12. With respect to rotation, the rod 12 cannot rotate about the X-axis due to the tail 34 being positioned along either side of the hook 24. That is, as best shown in FIG. 8, the tip 54 of the tail 34 includes two forked ends 62 that define the slot 40 therebetween. The forked ends 62 can, thus, "close around" either side of the hook 24 in order to prevent rotational movement of the hook 24 within the slot 40.

Figure 8:
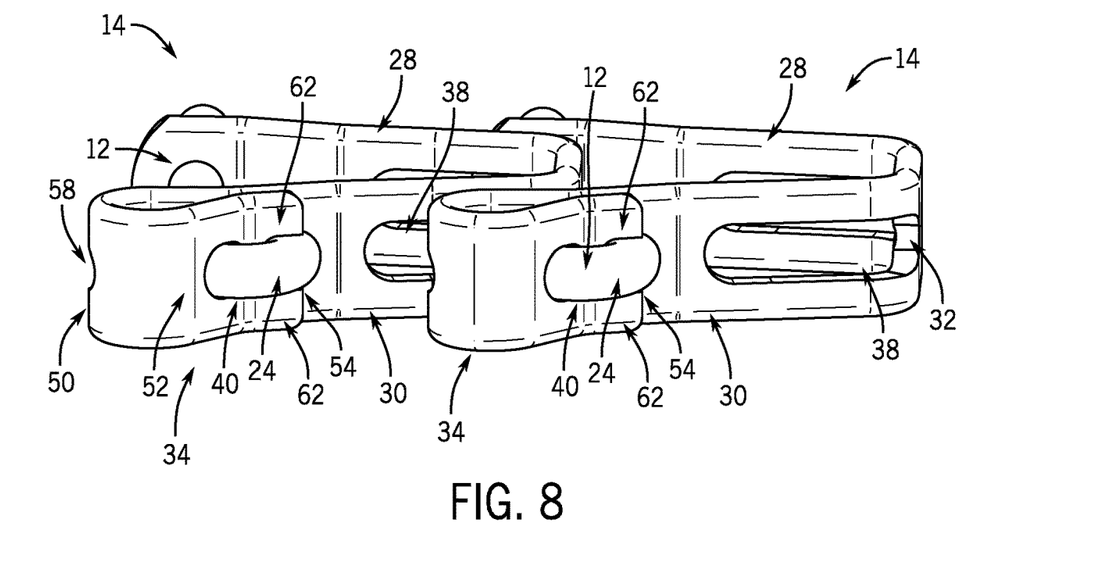
FIG. 8 illustrates an isometric outside view of a portion of the conveyor belt of FIG. 1.

Additionally, as shown in FIG. 8, the tail 34 can include an overall width substantially equal to a width of the outer leg 30. However, in some embodiments, the tail 34 and, more specifically, the forked ends 62 may be tapered such that the tip 54 has a width less than the width of the outer leg 30. In some applications, this tapering can help prevent the forked ends 62 from extending above or below the plane of the conveyor belt 10 (e.g., if they are bent outward too far away from the hook 24) and snagging on materials. Additionally, referring back to FIGS. 1, 2, and 8, as noted above, the rod 12 can be bent to form the hook 24 so that the tip 26 of the rod 12 faces the outer surface 48 of the outer leg 30. In this manner, the cut end of the rod 12 (i.e., the tip 26) is substantially protected from catching or snagging on parts, such as drive bar caps (not shown).

Figure 9:
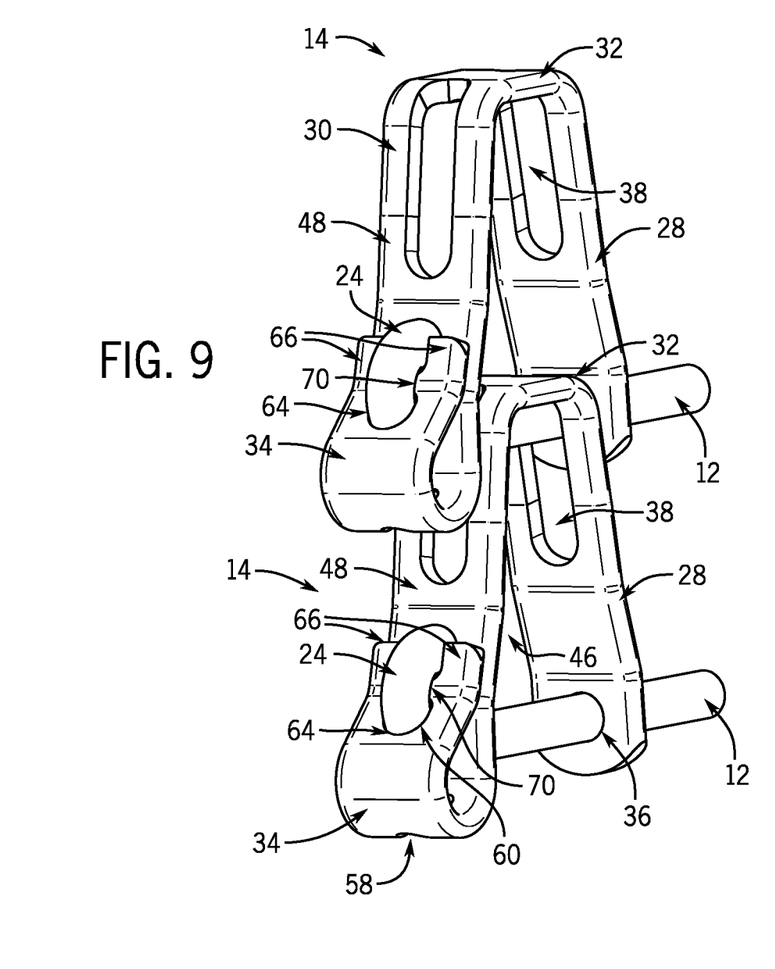
FIG. 9 illustrates an isometric view of a portion of a conveyor belt including links according to some embodiments.
Figure 10:
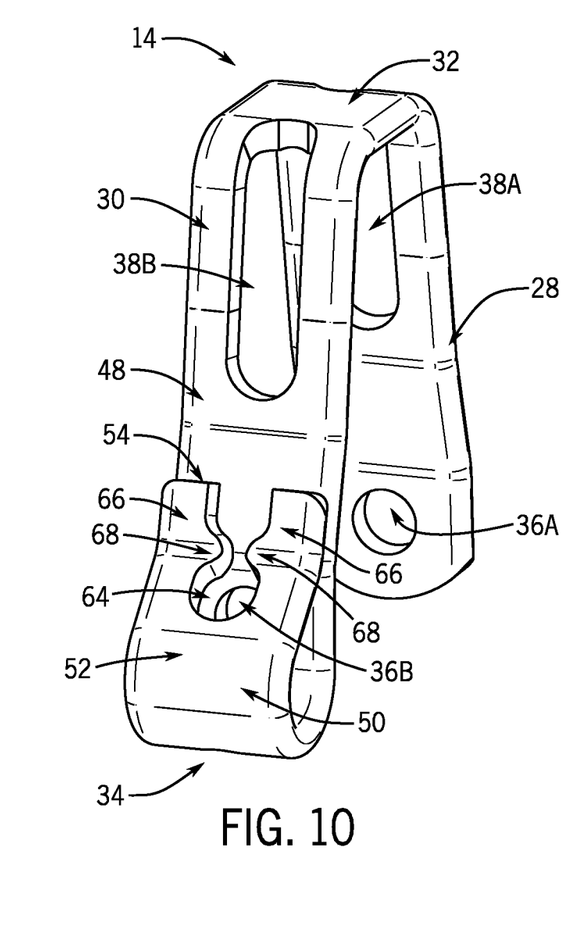
FIG. 10 illustrates an isometric view of one of the links of the conveyor belt of FIG. 9.

FIGS. 9 and 10 illustrate another link 14 according to some embodiments. The link 14 of FIGS. 9 and 10 can include substantially the same components as the link 14 of FIGS. 1, 2, and 4-8 and, thus, like components are numbered accordingly. However, the embodiment of FIGS. 9 and 10 can include a tapered slot 64. More specifically, the tail 34 can include clawed ends 66 that each have a claw portion 68. Each claw portion 68 can extend inwardly toward the opposite clawed end 66, thus forming the tapered slot 64. As a result, as shown in FIG. 9, the hook 24 can extend through a trailing part of the slot 64, around the claw portions 68, and back through or into a leading part of the slot 64.

As described above, the link 14 of the embodiments of FIGS. 1, 2, and 4-8 can prevent a rod 12 from sliding in the first lateral direction (e.g., "inward" movement toward the opposite lateral end of the conveyor belt 10) due to the tip 26 of the hook 24 abutting the outer surface 48 of the outer leg 30. The link 14 of the embodiments of FIGS. 9 and 10 can also prevent a rod 12 from sliding in the first lateral direction due to the tip 26 of the hook 24 abutting the outer surface 48 of the outer leg 30, and further due to an inner curve 70 of the hook 24 (also shown in FIG. 3) abutting surfaces of the claw portions 68 of the tapered slot 64. Accordingly, the link 14 of the embodiments of FIGS. 1, 2, and 4-8 can be considered a "single-lock" link 14 due to the single locking surface preventing such lateral movement (i.e., the outer surface 48 of the outer leg 30), while the link 14 of the embodiments of FIGS. 9 and 10 can be considered a "double-lock" link 14 due to the two locking surfaces preventing such lateral movement (i.e., the outer surface 48 of the outer leg 30 and the surfaces of the claw portions 68 of the tapered slot 64).

Figure 11:
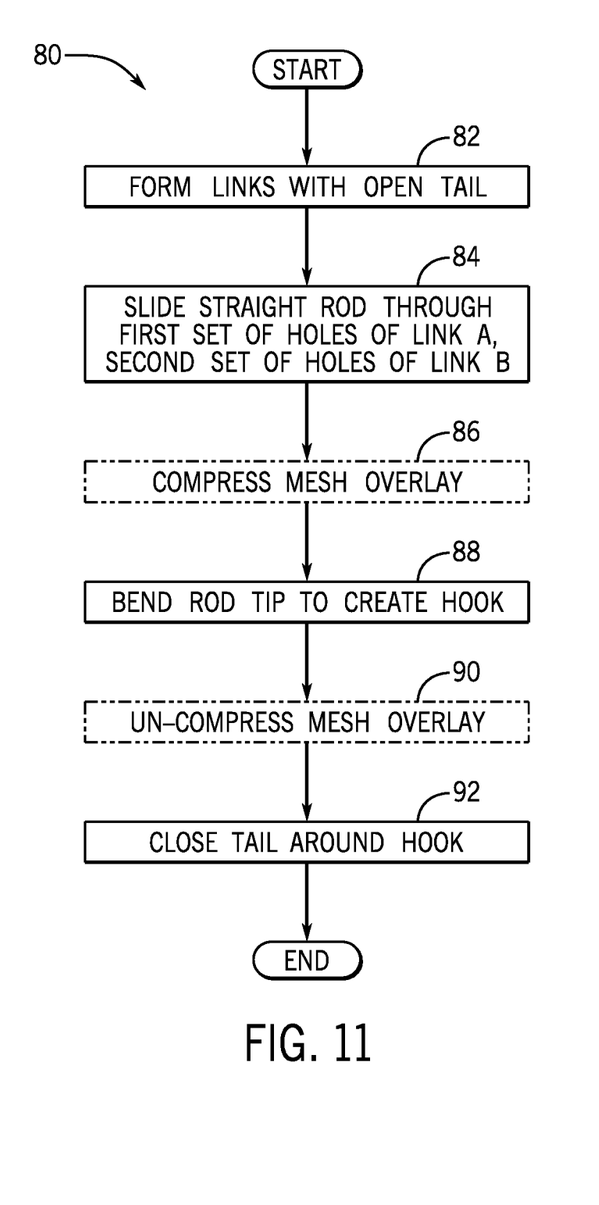
FIG. 11 illustrates a method of forming a conveyor belt according to some embodiments.

Turning now to FIG. 11, a method 80 of assembling a conveyor belt 10, according to some embodiments, is provided. The method 80 can be executed using the link 14 of FIGS. 1, 2, and 4-8, the link 14 of FIGS. 9 and 10, the link 14 of FIGS. 14 and 15 (described below), or the link 14 of FIGS. 16-18 (described below) in some embodiments, or another link not specifically described herein. As shown in FIG. 11, generally, the method 80 can include: initially forming links 14 with an open tail 34 at step 82; sliding a straight rod 12 into two links 14 at step 84; optionally compressing a mesh overlay 25 along the rod 12 away from the link 14 (if an overlay is desired for the particular application) at step 86; bending the rod tip 26 to create a hook 24 at step 88; if compressed at step 86, un-compressing the mesh overlay 25 along the rod 12 at step 90; and closing the tail 34 around the hook 24 at step 92. It should be noted that, while the steps of the method 80 are shown in a particular order in FIG. 11, in some embodiments, the method 80 may not include all steps shown, may include additional steps that are not shown, and/or may include certain steps in a different order. Additionally, in some embodiments, some steps may be performed manually or automatically (e.g., via a machine).

Figure 12:
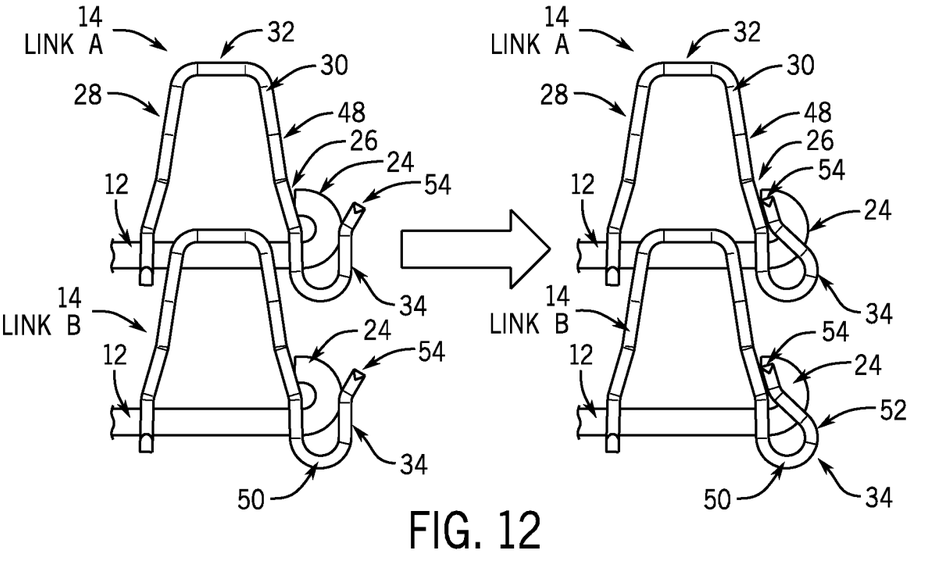
FIG. 12 illustrates bottom-up views of partially constructed and fully constructed links in accordance with the method of FIG. 11.

More specifically, at step 82, links 14 can be initially formed. For example, in some embodiments, a link 14 can be formed as a single integral piece, the sets of holes 36, 38 and the slot 40 can be punched through the piece, and the piece can then be bent to form the U-shape, creating the inner and outer legs 28, 30 and the middle portion 32. Furthermore, as shown in FIG. 12, the tail 34 may be initially bent to form at least the first curved portion 50, but not fully bent toward the outer surface 48 of the outer leg 30. In this manner, the tail 34 remains "open." Alternatively, in some embodiments, the tail 34 may not be initially bent at all, or may only be bent away from the outer leg 30 (e.g., so that the tip 54 faces away from the outer leg 30). In any such embodiments, the tail 34 may be considered "open" when it is not fully bent into its final position illustrated in FIGS. 1, 2, and 4-10.

At step 84, a straight rod 12 is slid through two nested links 14. That is, the rod 12 is slid through a first set of holes 36 of a first link 14 (e.g., "Link A" in FIG. 12) and a second set of holes 38 of a second link 14 (e.g., "Link B" in FIG. 12). At step 86, a mesh overlay (such as mesh overlay 25 shown in FIGS. 15 and 16) may optionally be applied over the rod 12 and compressed down the rod 12 away from the link 14. For example, the overlay can be compressed away from the link 14 to permit better access to the rod 12 and the link 14 for one or more of the remaining assembly steps, such as step 88.

That is, at step 88, the tip 26 of the rod 12, extending out from the outer leg 30 of the link 14, can be bent to create the hook 24. For example, the link 14 can be moved down the rod 12 into part of the middle portion 22 (which may be free of the mesh overlay 25 due to the compression at step 86), and the rod tip 26 bent to form the hook 24 so that the tip 26 faces the outer surface 48 of the outer leg 30. Once the hook 24 is bent into shape, the link 14 can be moved back to the lateral end portion 18 of the rod 12, e.g., until the rod tip 26 abuts or is adjacent to the outer surface 48 of the outer leg 30. Additionally, the mesh overlay 25 can be uncompressed back along the middle portion 22 of the rod 12 at step 90.

At step 92, the tail 34 can be closed around the hook 24, resulting in a completed link and rod assembly, as shown in FIG. 12. In some embodiments, at step 92, the forked ends 62 or the clawed ends 66 of the tail 34 can be pressed toward the outer surface 48 of the outer leg 30, e.g., such that the tail 34 rotates about the Z-axis at the first curved portion 50. For example, with respect to the clawed ends 66, the tail 34 can be pressed toward the outer surface 48 with enough force to cause the clawed ends 66 to deform around the hook 24. Alternatively, in some embodiments, the forked or clawed ends 62, 66 of the tail 34 can be pulled away from each other (e.g., moving along a plane of the Z-axis) and then pressed toward the outer surface 48 of the outer leg 30. For example, the tail ends 62, 66 can be pulled away from each other to clear the hook 24, pressed toward the outer surface 48 of the outer leg 30, and then pushed back toward each other to lock around the hook 24.

In some embodiments, the above method 80 can be executed in an iterative manner, such that the method steps are repeated for successive rods 12 and links 14. In other embodiments, the above method 80 can be executed as a singular process for the entire length of the conveyor belt 10, such that the method steps are completed for all rods 12 and links 14 at the same time. In yet other embodiments, the method 80 can be executed in an iterative manner for set lengths of conveyor belt 10, such that the method steps are executed as a singular process from multiple links 14 and rods 12 in the set length, and then repeated for another set length. Additionally, one or more of the method steps may be reversed and/or repeated in order to assemble one or more rods 12 and/or links 14 in a length of the conveyor belt 10. Moreover, one or more of the method steps may be repeated to secure the links 14 and rods 12 on the opposite side (e.g., the second lateral end) of the conveyor belt 10. For example, in some embodiments, the method 80 may be executed along each end 16 of the conveyor belt 10 simultaneously. However, in other embodiments, each end 16 of the conveyor belt 10 may be assembled separately.

The method 80 of FIG. 11, according to some embodiments, does not include any welding steps, thus producing a weldless conveyor belt 10. As such, the method 80 can be executed, for example, during install or repair in or out of the field without the manufacturing costs associated with welding equipment and technicians, weld inspections and hot-work permits, patch-table rework, field services visits to make inspections and repairs, etc. Additionally, because no welds are necessary, plastic mesh overlays can be used with the conveyor belt 10 in some applications without the restrictions and limitations typically encountered when welding near plastic materials.

Once the conveyor belt 10 is assembled, such as in accordance with the method 80 of FIG. 11, it may be used in a system, such as a friction-driven spiral cage system. For example, as described above and shown in FIG. 13, one or more drive bars 20 of a spiral cage system driven by an internal drum (not shown) can engage the lateral end 16 of the conveyor belt 10 to drive the conveyor belt 10 along a helical travel path. As shown in FIG. 13, during operation, the tail 34 of each link 14 contacts the drive bar 20 along the second curved portion 52, that is, due to the tail 34 of each link 14 extending laterally outward past an outermost portion of each rod 12 (such as the curved edge 60 of the hook 24). With this configuration, the tail 34 can provide a larger surface, e.g., a line contact surface, for contacting the drive bar 20 compared to, for example, a point contact surface of a rod 12. A larger contact surface can help more effectively drive the conveyor belt 10 forward with lower tension compared to a point surface. And such larger contact surface can, in turn, further prevent potential tenting of the conveyor belt 10.

Figure 14:
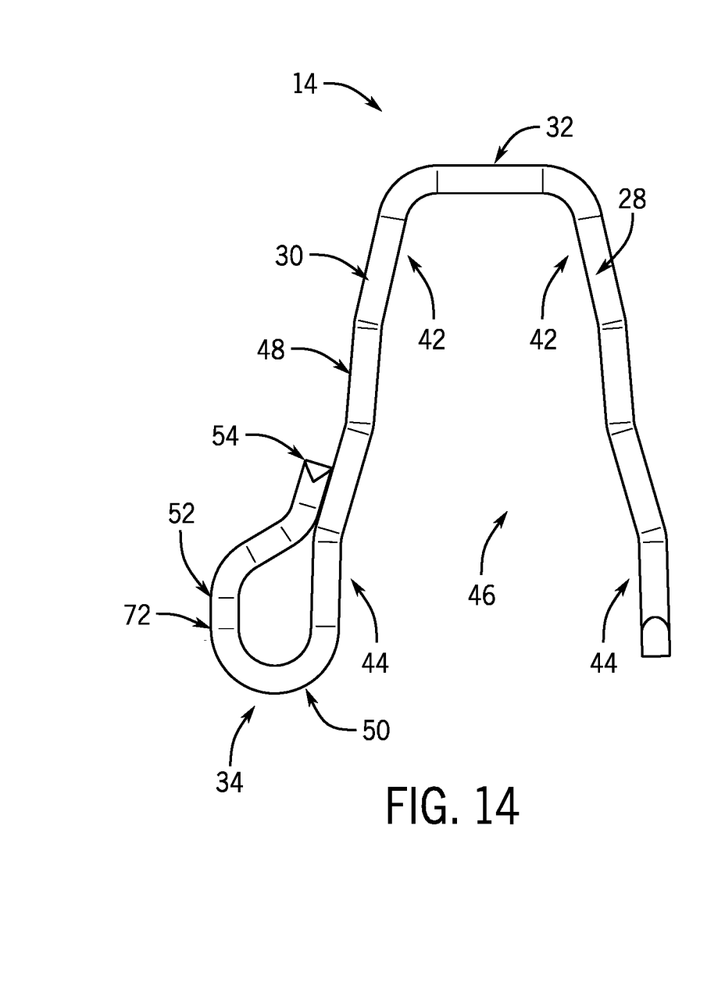
FIG. 14 illustrates a top-down view of a link according to some embodiments.
Figure 15:
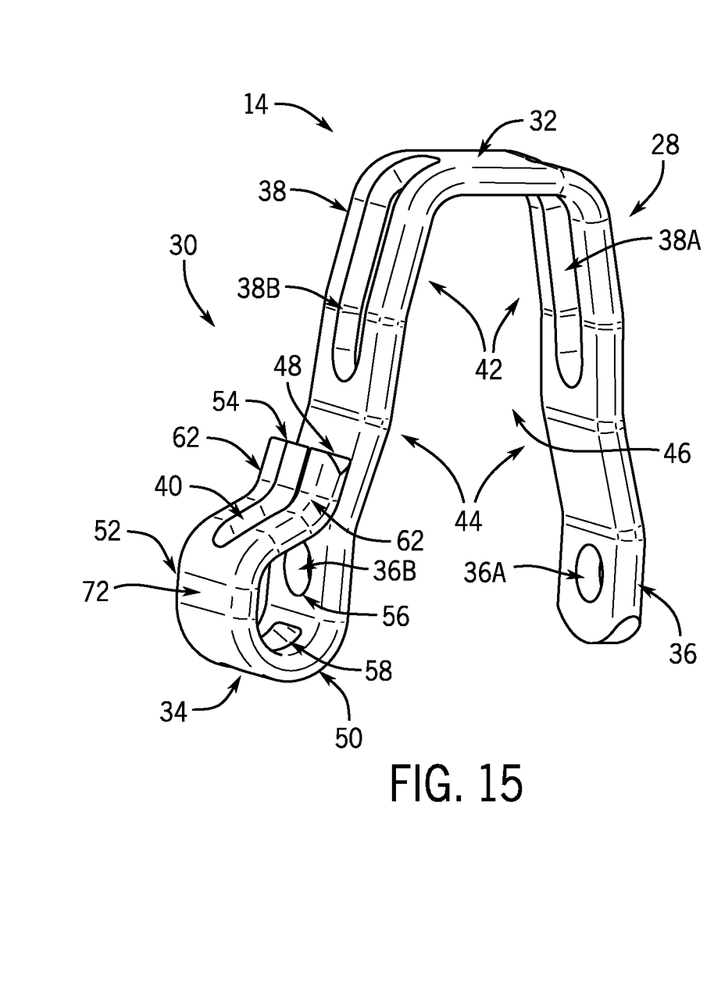
FIG. 15 illustrates an isometric view of the link of FIG. 14.

Additionally, in some embodiments, the second curved portion 52 can be substantially flattened along an outermost edge 72 of the link 14, thus fostering additional contact surface area between the link 14 and the drive bar 20. For example, FIGS. 14 and 15 illustrate a link 14, according to some embodiments. The link 14 of FIGS. 14 and 15 can include many of the same components as the link 14 of FIGS. 1, 2, and 4-8 (and, thus, like components are numbered accordingly), but can further include a flattened outermost edge 72.

Figures 16, 17:
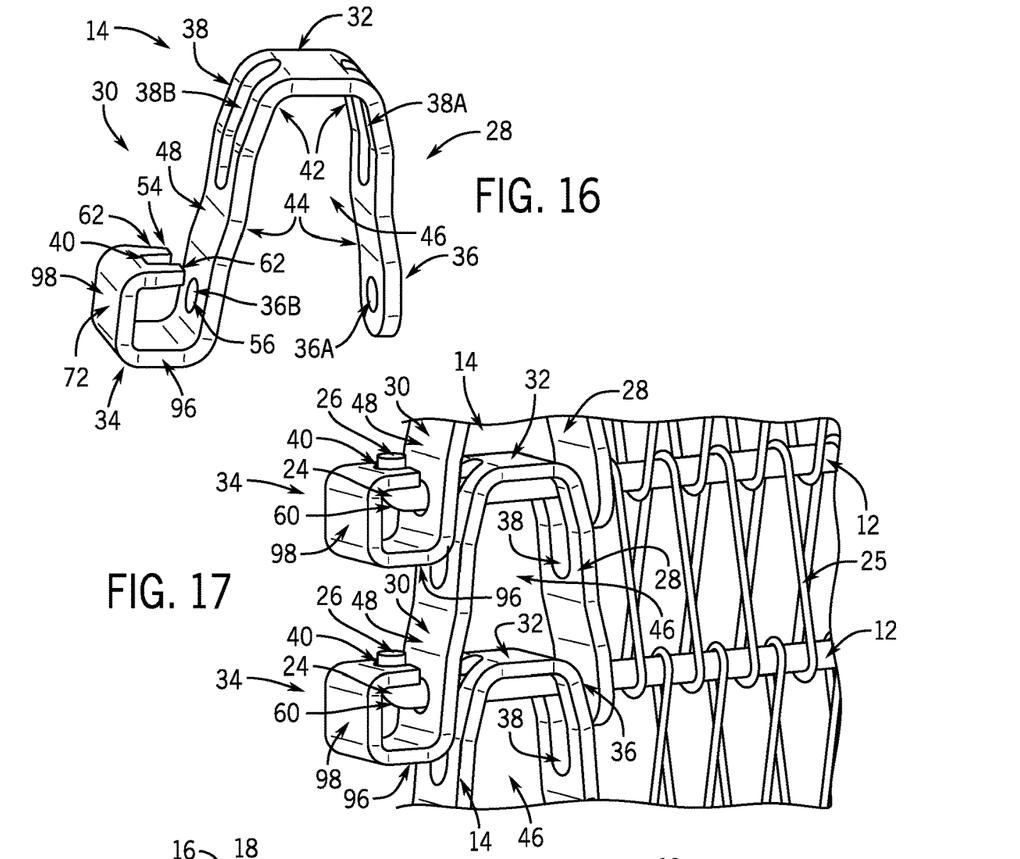
FIG. 16 illustrates an isometric view of a link according to some embodiments.
FIG. 17 illustrates an isometric view of a portion of a conveyor belt including the link of FIG. 16.
Figure 18:
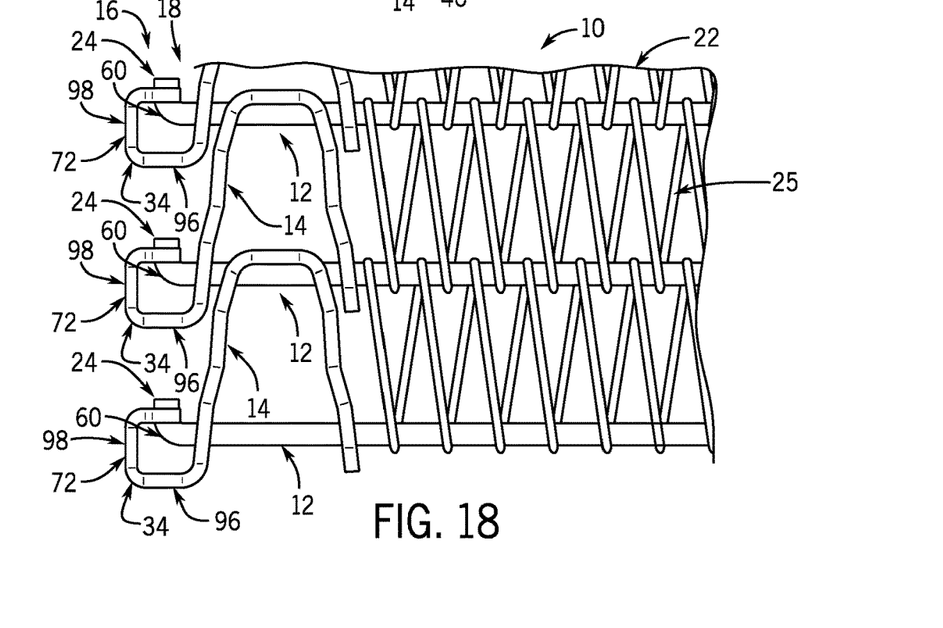
FIG. 18 illustrates a top-down view of a portion of the conveyor belt of FIG. 17.

As another example, FIGS. 16-18 illustrate another link 14 according to some embodiments. The link 14 of FIGS. 16-18 can include many of the same components as the link 14 of FIGS. 1, 2, and 4-8 and the link 14 of FIGS. 9 and 10 and, thus, like components are numbered accordingly. As shown in FIGS. 16-18, the tail 34 can extend from the distal end 44 of the outer leg 30 in a direction away from the inner leg 28 and curve back toward the inner leg 28, terminating adjacent to or touching an outer surface 48 of the outer leg 30. However, rather than forming a tear-drop shape with the outer leg 30, like the links 14 shown in FIGS. 1 and 4, the tail 34 can form a square or rectangular shape with the outer leg 30 when viewed from the top down, such as in FIG. 18. More specifically, for example, the tail 34 can include a first portion 96 (e.g., a trailing portion), a second portion 98 (e.g., an outer portion), and a tip 54. As shown, rather than first and second curved portions 50, 52, as in the links of FIGS. 1, 2, and 4-10, the first portion 96 and the second portion 98 can be substantially flat. Furthermore, the tip 54 can lie substantially parallel with the first portion 96, facing the outer leg 30.

Additionally, as shown in FIGS. 16-18, the slot 40 can extend from the tip 54 toward the second portion 98, but not extend into the second portion 98. Furthermore, the tip 54 and, thus, the slot 40 can be positioned forward (e.g., in the direction of travel) of a trailing-most point 56 of the first set of holes 36. In some embodiments, the rod 12 may be bent about 90 degrees such that the tip 26 of the rod 12 lies substantially perpendicular to the middle portion 22 of the rod 12 (e.g., forming an "L" shape), and can extend into and beyond the slot 40. More specifically, the rod 12 may be bent so that the rod 12 extends completely through the slot 40 once, and the tip 26 of the rod 12 terminates outside of the slot 40. However, in some embodiments, the rod 12 may be bent so that the rod 12 only partially extends through the slot 40, such that the tip 26 of the rod 12 terminates within the slot 40.

With this configuration, as shown in FIGS. 16-18, the tail 34 of each link 14 extends laterally outward past an outermost portion of each rod 12 (such as an outermost curved edge 60 of the hook 24). As a result, during operation, the tail 34 of each link 14 contacts a drive bar 20 along the second portion 52. Furthermore, as the second portion 98 (corresponding to an outermost edge 72 of the link 14) is substantially flat, the link 14 can provide additional contact surface area that engages the drive bar 20, for example, compared to a curved outer edge 72.

It is to be understood that the disclosure is not limited in its application to the details of construction and the arrangement of components set forth in the accompanying description or illustrated in the accompanying drawings. Given the benefit of this disclosure, one skilled in the art will appreciate that the disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," "back," "leading," or "trailing" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration. Additionally, as used herein, unless otherwise defined or limited, directional terms are used for convenience of reference for discussion of particular figures or examples. For example, references to top, bottom, upward, downward, trailing, leading, or other directions, orientations, or positions may be used to discuss aspects of a particular example or figure, but do not necessarily require similar orientation or geometry in all installations or configurations.

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, the term "about" or "approximately" or "substantially" refers to variation in the numerical quantity that may occur, for example, through typical measuring and manufacturing procedures used for conveyor belts or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about," "approximately," and "substantially" refer to a range of values ±20% of the numeric value that the term precedes.

This discussion is presented to enable a person skilled in the art to make and use embodiments of the disclosure. Given the benefit of this disclosure, various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The accompanying detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A conveyor belt comprising:
a first lateral end;
a second lateral end;
a plurality of rods spaced apart from one another and each extending from the first lateral end to the second lateral end; and
a plurality of links interconnecting the plurality of rods, the plurality of links including a first link coupled to two adjacent rods of the plurality of rods at the first lateral end, the first link including a tail that extends laterally outward past an outermost portion of the plurality of rods,
wherein a first rod of the two adjacent rods terminates with a hook, the hook extending through a slot of the tail in a manner that prevents rotation of the first rod.

2. The conveyor belt of claim 1, wherein the tail includes two tail ends defining the slot therebetween.

3. The conveyor belt of claim 2, wherein the hook extends through a trailing part of the slot, around claw portions of the tail ends, and back through a leading part of the slot.

4. The conveyor belt of claim 1, wherein the plurality of links further includes a second link coupled to the two adjacent rods at the second lateral end.

5. The conveyor belt of claim 4 and further comprising a mesh overlay extending across the plurality of rods between the first link and the second link.

6. The conveyor belt of claim 5, wherein the mesh overlay is a plastic mesh overlay.

7. A conveyor belt comprising:
a plurality of rods spaced apart from one another, each of the plurality of rods including a first lateral end portion with a first hook that terminates at a tip; and
a plurality of links interconnecting the plurality of rods, each of the plurality of links including:
a middle portion,
an inner leg extending from the middle portion,
an outer leg extending from the middle portion,
a first set of holes extending through the inner leg and the outer leg, and
a tail extending from the outer leg, the tail including a slot,
wherein a first rod of the plurality of rods engages a first link of the plurality of links such that the first hook extends through the first set of holes and the slot and the tip faces an outer surface of the outer leg of the first link.

8. The conveyor belt of claim 7, wherein each of the plurality of links further includes a second set of holes extending through the inner leg and the outer leg, wherein the first set of holes are circular through-holes and the second set of holes are slotted through-holes.

9. The conveyor belt of claim 7, wherein the tail includes a trailing curved portion, an outer curved portion, and a tip, the slot extending from the tip into the outer curved portion.

10. The conveyor belt of claim 9, wherein the tail further includes a hole extending through the trailing curved portion.

11. The conveyor belt of claim 7, wherein the tail forms a tear-drop shape with a portion of the outer leg.

12. The conveyor belt of claim 7, wherein the slot is defined between two forked ends.

13. The conveyor belt of claim 7, wherein the slot is defined between two clawed ends, where each of the two clawed ends includes a claw portion that extends inwardly, and wherein the first hook extends through a trailing part of the slot, around claw portions, and back through a leading part of the slot.

14. A method of forming a conveyor belt, the method comprising:
sliding a rod through a first set of holes of a first link and a second set of holes of a second link so that a tip of the rod extends past an outer leg of the first link;
bending the tip of the rod to form a hook; and
bending a tail of the first link that extends from the outer leg back toward the outer leg until ends of the tail close around either side of the hook.

15. The method of claim 14 and further comprising pulling the ends of the tail apart from each other to close the ends around either side of the hook.

16. The method of claim 14, wherein bending the tail of the first link includes bending the tail until a slot of the tail terminates above a trailing-most point of the first set of holes.

17. The method of claim 14, wherein bending the tip of the rod to form the hook includes bending the tip of the rod until the tip faces an outer surface of the outer leg of the first link.

18. The method of claim 14 and further comprising compressing a mesh overlay away from the first link before bending the tip of the rod.

19. The method of claim 18 and further comprising uncompressing the mesh overlay after bending the tip of the rod.

* * * * *